United States Patent [19]
Minato et al.

[11] Patent Number: 5,112,281
[45] Date of Patent: May 12, 1992

[54] DRIVING SYSTEM FOR AUXILIARIES OF ENGINE AND METHOD FOR ADJUSTING TENSION OF BELT FOR DRIVING AUXILIARIES

[75] Inventors: Norio Minato; Makoto Kishida; Yumi Yamada; Izumi Watanabe; Kiyomi Kimura, all of Hiroshima, Japan

[73] Assignee: Mazda Motor Corporation, Hiroshima, Japan

[21] Appl. No.: 661,169

[22] Filed: Feb. 27, 1991

[30] Foreign Application Priority Data

Mar. 7, 1990 [JP] Japan ............................. 2-23501[U]
Mar. 7, 1990 [JP] Japan ............................. 2-23502[U]

[51] Int. Cl.$^5$ ............................................. F16H 7/08
[52] U.S. Cl. ......................................... 474/84; 474/133
[58] Field of Search .................... 474/84, 87, 88, 113, 474/114, 133

[56] References Cited

U.S. PATENT DOCUMENTS 3,071,980  1/1963  Brewer ............................. 474/133
4,966,571 10/1990  de Guillebon ................. 474/133 X Primary Examiner—William P. Neuder
Attorney, Agent, or Firm—Fish & Richardson

[57] ABSTRACT

Plural auxiliaries are independently driven by a belt ot suppress an increase in the number of parts and simplify the structure. A cam shaft has first and second driving pulleys disposed in parallel to each other. A first auxiliary having a smaller load against the engine is movably mounted to the engine and it has a first following pulley mounted to its operating shaft which is coaxially and rotatably mounted with an idle pulley. On the other hand, a second auxiliary having a larger load against the engine is fixed to the engine. To the engine is movably mounted a tension pulley. A first belt for driving the first auxiliary is wound around the first following pulley, the first driving pulley and a tension pulley, while a second belt for driving the second auxiliary is wound around the second driving pulley and the idle pulley. The tension of the first belt is adjusted by transferring the tension pulley, while the tension of the second belt is adjusted by transferring the first auxiliary.

16 Claims, 4 Drawing Sheets

DRIVING SYSTEM FOR AUXILIARIES OF ENGINE AND METHOD FOR ADJUSTING TENSION OF BELT FOR DRIVING AUXILIARIES

BACKGROUND OF THE INVENTION

1. Field of the Invention

The present invention relates to a driving system for auxiliaries or auxiliary machine of an engine and a method for adjusting tension of a belt for driving the auxiliaries and, more particularly, to a driving system for auxiliaries for an engine, so adapted to be driven by a belt and to a method for adjusting the tension of the belt for driving the auxiliaries.

2. Description of Related Art

Auxiliaries or auxiliary machine disposed to the engine body may include, for example, an alternator, a pump for an air conditioner, a pump for cooling water, i.e. water pump. These auxiliaries are mechinically connected to an output shaft of the engine so as to be driven directly by output of the engine.

As technology involved with a driving system for auxiliaries, Japanese Utility Model Laid-open (kokai) Publication No. 80,127/1986 discloses an example in which a crank shaft functioning as the output shaft of the engine is connected through a belt to various auxiliaries.

U.S. Pat. No. 4,502,345 discloses a system in which a pump for an air conditioner is connected to a crank shaft through a belt as well as a cam shaft is also connected to a water pump, etc., through the belt. It can be noted herein that the cam shaft is such that generally it is connected to the crank shaft through a timing belt, so that it can be classed with the crank shaft as a source of driving the auxiliaries.

Heretofore, a driving system for auxiliary has been commonly constructed in such a manner that a plurality of auxiliaries are driven by a common belt. For instance, Japanese Utility Model Laid-open (kokai) Publication No. 80,127/1986 discloses the driving system for auxiliaries constructed such that the alternator and the water pump are to be driven by a first common belt and that the pump for power steering and the pump for air conditioner are to be driven by a second common belt.

Further, U.S. Pat. No. 4,502,345 discloses the driving system for auxiliaries, in which the pump for air conditioner is to be driven by a first belt wound around the crank shaft and the cam shaft and the pump for the power steering is to be driven by a second belt wound around the crank shaft and the cam shaft, while the water pump and the alternator are to be driven by a common belt wound around the cam shaft.

It should be noted, however, that the driving of two auxiliaries by one belt presents the following problems. More specifically, when two auxiliaries are driven by the belt wound around the crank shaft and the cam shaft, as shown in U.S. Pat. No. 4,502,345, the crank shaft serves as a driving axle while the cam shaft serves as a following axle, so that the crank shaft cannot be classed with the cam shaft.

Hence, when a conventional layout for the driving system for the auxiliaries is adopted, the following problems may occur:

1. Vibration is likely to occur with respect to the belt; and
2. It is difficult to ensure reliability upon operation of auxiliaries.

In order to ensure reliability upon operation of the auxiliaries, therefore, it is desired to drive each of the auxiliaries by respective and separate belts. It is further desired in this case that a tensioner is to be mounted to each of the belts so as to adjust the belts as well as to suppress the tension thereof, in order to compete with elongation of the belts.

It can be noted, however, that the disposition of the belts and the tensioners for the respective auxiliaries necessarily leads to an increase in the number of parts, thereby making the structure of the engine more complex and larger. It is thus necessary to simplify the structure of the engine and decrease the number of parts when each of the auxiliaries is to be driven by the separate belt.

SUMMARY OF THE INVENTION

Therefore, the object of the present invention is to provide a driving system for driving auxiliary so adapted as to suppress an increase in the number of parts when a plurality of auxiliaries are to be driven by respective belts disposed independently and separately.

Another object of the present invention is to provide a driving system for driving the auxiliaries so adapted as to avoid complexity of adjusting the tension of each of the belts, when a plurality of auxiliaries are to be driven by respective belts disposed independently and separately, and to provide a method for adjusting tension of the belt to be employed for driving the auxiliaries.

A further object of the present invention is to provide a driving system for driving the auxiliaries so adapted as to lay out elements in a concise and compact way when plural auxiliaries are to be driven by respective belts disposed independently and separately.

In order to achieve the aforesaid objects, the present invention generally consists of a driving system for driving auxiliaries comprising:

a first driving pulley and a second driving pulley disposed parallel to a driving shaft;

a first auxiliary mounted movable to an engine body;

a first following pulley fixed to an operating shaft of said first auxiliary;

an idle pulley disposed rotatably and coaxially with said operating shaft thereof;

a second auxiliary fixed to the engine body;

a second following pulley fixed to an operating shaft of said second auxiliary;

a tension pulley mounted movably to the engine body;

a first belt wound around said first driving pulley, said first following pulley and said tension pulley; and a second belt wound around said second driving pulley, said idle pulley and said second following pulley.

Therefore, the present invention can simplify the structure of a driving system using separate and independent belts for each of the auxiliaries because the first auxiliary is also employed as a tensioner for the belt for the second auxiliary.

Also, when the first auxiliary working as the tensioner, too, is a light load auxiliary, there can be avoided application of an excessive load to a mounting portion of the structure in which the first auxiliary is disposed in a movable manner. Further, stability can be ensured in operating the first auxiliary.

Further, when the idle pulley is disposed in parallel to the following pulley for the first auxiliary device and in the position closer to the body of the first auxiliary, a bending moment to be applied to the operating shaft of the first auxiliary can be lessened, so that smoothness in operation of the auxiliaries, durability of the shaft, etc., can be improved.

Furthermore, when the idle pulley is mounted to the shaft of the first auxiliary through a bearing and when the idle pulley is disposed in the position closer to the body of the first auxiliary than the following pulley, the bending moment to be applied to the shaft become smaller, as compared with the disposition of the idle pulley and the following pulley in the opposite way. Further, the use of the idle pulley having the same diameter as the following pulley can suppress the bearing from wearing. When the idle pulley is mounted to the body of the first auxiliary through the bearing, the bending moment applied to the shaft for the first auxiliary can be reduced more.

A further preferred embodiment is an arrangement for the tension pulley to be disposed within and inside a locus of travel of the second belt. This arrangement can accommodate a loop of the belt for driving the second auxiliary within a loop of the belt for driving the first auxiliary.

The construction of the driving system according to the present invention can ensure smoothness in operation of the first auxiliary and durability of the operating shaft for the first auxiliary and so on.

When the idle pulley is so designed as to have the same size in diameter as the following pulley for the first auxiliary, rotation of the idle pulley relative to the operating shaft for the first auxiliary can be suppressed, thereby preventing wear of the bearing, etc.

The other features and advantages of the present invention will become apparent from the following embodiments.

In the various modes of construction as described hereinabove, it is desired that the first auxiliary is so designed as to serve as an auxiliary with a small load against the engine, while the second auxiliary is so designed as to serve as an auxiliary with a large load against the engine.

When the idle pulley to be disposed to the first auxiliary is mounted through the bearing to the shaft mounted, for example, with the following pulley for the first auxiliary, it is desired that the idle pulley is disposed in the position parallel to the following pulley and closer to the body of the first auxiliary. In mounting the idle pulley through the bearing to the shaft mounted with the following pulley for the first auxiliary, it is desired that the idle pulley has the same size in diameter as the following pulley.

The idle pulley may be mounted through the bearing to a support sleeve disposed at the body of the first auxiliary.

The aforesaid modes of construction can allow each of the auxiliaries to be independently driven through each of the belts by means of the driving shaft and can enable the first auxiliary disposed to be movable and mounted with the idle pulley to be employed as the tensioner for adjusting the tension of the belt for driving the second auxiliary.

Further, when the auxiliary with a light load is employed as the first auxiliary, application of an excessive load is suppressed from being imposed upon the site at which the first auxiliary is mounted.

Other objects, features and advantages of the present invention will become apparent in the course of the description of the preferred embodiments, which follows, in conjunction with the accompanying drawings.

DETAILED DESCRIPTION OF THE PREFERRED EMBODIMENTS

The present invention will be described more in detail in conjunction with the accompanying drawings.

Figure 1:
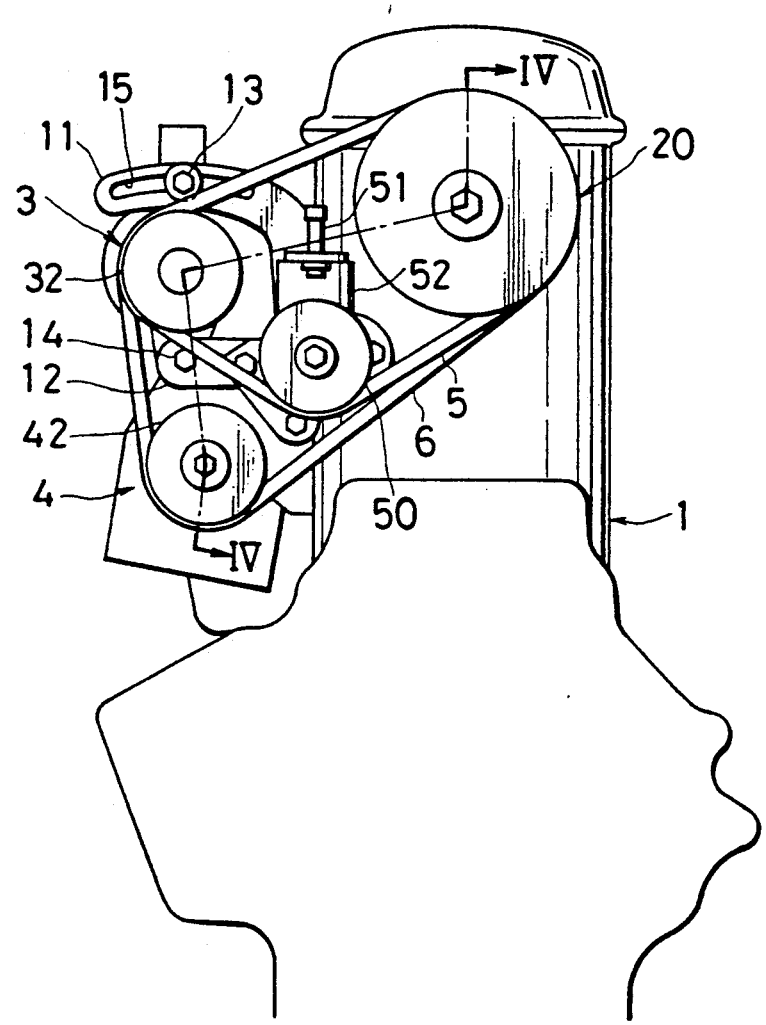
FIG. 1 is an elevation view showing a driving system for driving auxiliaries according to an embodiment of the present invention, when looked from the rear of the engine.
Figure 2:
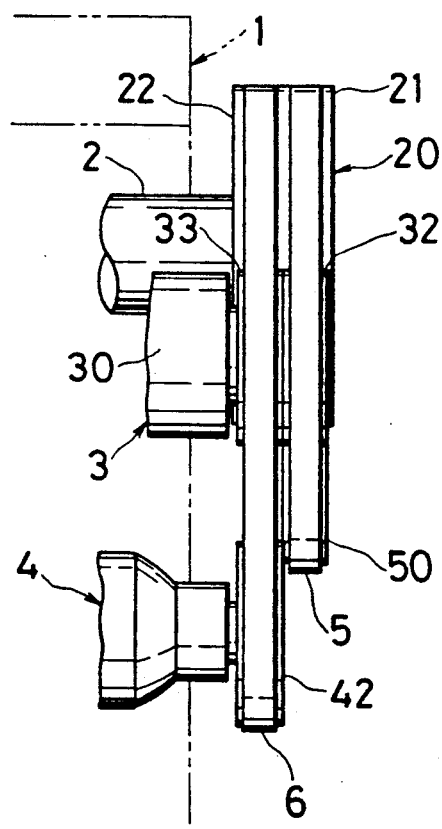
FIG. 2 is a side view showing the driving system of FIG. 1.
Figure 3:
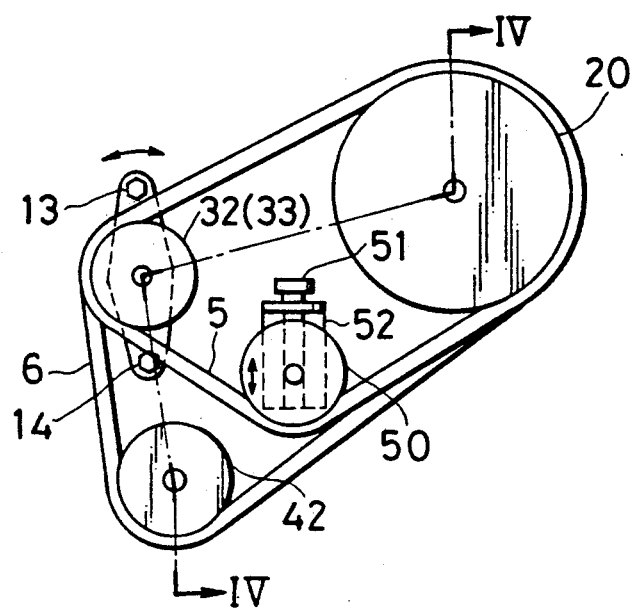
FIG. 3 is a diagrammatic representation showing a layout of each of elements contained in the driving system of FIG. 1.
Figure 4:
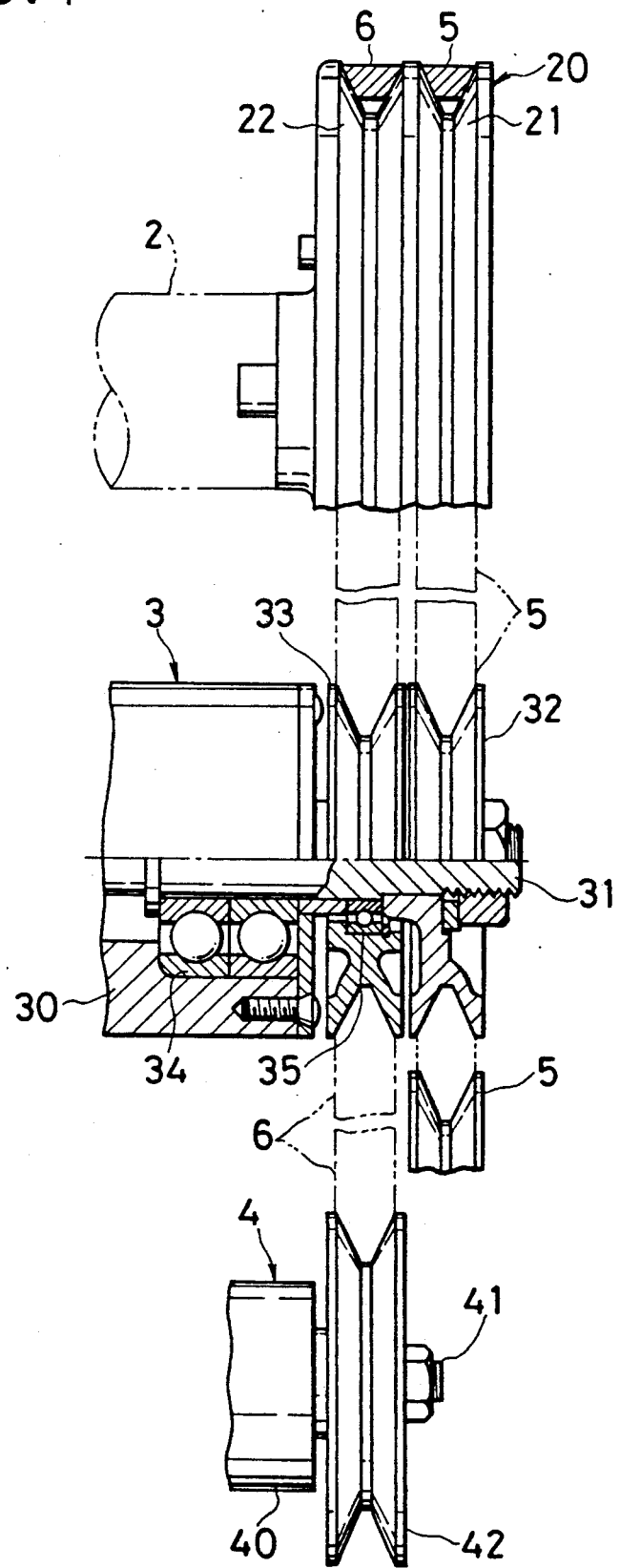
FIG. 4 is a sectional view taken along line IV—IV of FIGS. 1 and 3.

FIGS. 1 to 4 show an embodiment of the system according to the present invention, in which two auxiliaries are driven by a cam shaft of a diesel engine. As shown in FIGS. 1 and 2, a cam shaft 2 functioning as a driving shaft for the auxiliaries is disposed at an upper portion of an engine body 1. The cam shaft 2 on the front side of an engine is so constructed as to be rotated in association with a crank shaft (not shown) by a driving force transmitted through a transmission mechanism from the crank shaft. On the other hand, the cam shaft 2 on the rear side thereof is provided at its end portion with a driving pulley 20 which in turn has two rows of pulley sections 21 and 22 disposed in a direction parallel to the axial direction, as shown in FIG. 4 which is an enlarged view showing the essential portion of a drive unit.

At a rearward side portion of the engine body 1 are disposed at least two auxiliaries 3 and 4, for example, a vacuum pump and an oil pump for a power steering. The two auxiliaries 3 and 4 have different loads and, in this embodiment, the vacuum pump serves as an auxiliary 3 on the light load side (hereinafter referred to as first auxiliary) and the oil pump for the power steering serves as an auxiliary 4 on the heavy load side (hereinafter referred to as second auxiliary). Each of the first and second auxiliaries 3 and 4 is driven by the cam shaft 2 through separately and independently disposed belts 5 and 6, respectively.

The first auxiliary 3 on the light load side is movably mounted to the engine body 1. Specifically, the first auxiliary 3 is mounted in such a manner that mountings disposed on both of its upper and lower sides are mounted to upper and lower brackets 11 and 12 by bolts 13 and 14, respectively. The bolt 13 is so inserted through a circle-shaped longitudinal hole 15 formed in the upper bracket 11 as to allow the first auxiliary 3 to pivotably move about the lower bolt 14 when the bolts 13 and 14 are loosened, as shown in FIG. 3, on the one hand, and as to fix it when the bolts 13 and 14 are fastened in such a state that the position of the first auxiliary 3 is adjusted within the movable range. As shown in FIG. 4, the first auxiliary 3 has a shaft 31 held by a body 30 through a bearing 34 and the shaft 31 is disposed parallel to a following pulley 32 so disposed as to be rotated integrally with the shaft 31, and to an idle pulley 33 disposed rotatably with respect to the shaft 31. In this embodiment, the following pulley 32 is located in the position closer to the top end of the shaft 31, on the one hand, and the idle pulley 33 is located in the position closer to the body, on the other hand. Further, the idle pulley 33 is mounted to the shaft 31 through a bearing 35. The idle pulley 33 is formed in the same diameter as the following pulley 32.

On the other hand, the second auxiliary 4 on the heavy load side is rigidly mounted to the engine body 1. The second auxiliary 4 has a following pulley 42 disposed at a top end of a shaft 42 held rotatably by the body 40.

A second auxiliary driving system for transmitting the rotation of the cam shaft 2 to the second auxiliary 4, on the one hand, is constructed such that the second belt 6 for driving the second auxiliary is wound on the pulley section 22 on the inner side of the driving pulley 20, the idle pulley 33 disposed to the first auxiliary 3 and the following pulley 42 for the second auxiliary 4. In the second auxiliary driving system, the first auxiliary 3 is utilized as a tensioner for adjusting the tension of the second belt 6.

In a first auxiliary driving system for transmitting the rotation of the cam shaft 2 to the first auxiliary 3, on the other hand, is constructed such that the first belt 5 for driving the first auxiliary is wound on the pulley section 21 on the outer side of the driving pulley 20, the following pulley 32 for the first auxiliary 3, and a tension pulley 50 disposed movably to the engine body 1. The tension pulley 50 is so disposed inside the loop of the belt 6 for driving the second auxiliary when looked from the rearward side of the engine, as shown in FIGS. 1 and 3. The tension pulley 50 is so supported by a bracket 52 through an adjusting screw 51 in such a state that its portion for supporting the pulley shaft is movable in the vertical direction of the automotive vehicle body and so disposed as to be movable vertically in association with the pivotal movement of the adjusting screw 51.

The system according to this embodiment of the invention is so constructed that the first and second auxiliaries 3 and 4 are driven by the cam shaft 2 through the independently and separately disposed belts 5 and 6, respectively, in order to enhance reliability. Further, the idle pulley 33 is disposed to the first auxiliary 3 mounted movably to the engine body 1, and the first auxiliary 3 is utilized as a tensioner for the belt 6 for driving the second auxiliary. And the belt 6 for driving the second auxiliary is so disposed as to allow its tension to be adjusted by the first auxiliary 3. Hence, the use of the first auxiliary 3 as the tensioner, too, can ensure stability in operation as well as simplify the structure. More specifically, although vibration is likely to be applied to the mounting portion of the second auxiliary 4 due to a variation in torque as well as a large degree of rotational force proportional to the load acts upon the mounting portion of the second auxiliary 4, the second auxiliary 4 is rigidly mounted to the engine body 1 so as to ensure rigidity of the mounting portion of the second auxiliary 3 against the load. On the other hand, the first auxiliary 3 which is relatively small in rotational force and vibration is movably mounted to the engine body 1, thereby permitting reduction of the load imposed upon the mounting portion at which the first auxiliary 3 is to be transferred and ensuring stability of operation of the first auxiliary 3.

Further, in this embodiment, the idle pulley 33 is mounted through the bearing 35 to the shaft 31 mounted to the following pulley 32 for the first auxiliary 3 in such a state that the idle pulley 33 is disposed in the position parallel to the following pulley 32 and closer to the side of the body 30 than the following pulley 32. This disposition of the idle pulley 33 can suppress the bending moment applied to the shaft 31 to a lesser extent. In other words, in such a structure that the following pulley 32 and the idle pulley 33 are supported by the shaft 31 held by the body 30, a bending moment acts upon the shaft 31 due to pressing force to be applied to the following pulley 32 and the idle pulley 33 from the belts 5 and 6, respectively. In this case, a large pressing force is applied to the idle pulley 33 in accordance with the load from the belt 6 for driving the second auxiliary, however, the bending moment to be applied from this force is reduced by shortening the distance from the fulcrum portion of the shaft by disposing the idle pulley 33 in the position closer to the body so that the bending moment to be applied to the shaft 31 can be made smaller as compared with the disposition of the following pulley 32 and the idle pulley 33 made in the opposite way as in this embodiment.

Further, as described hereinabove, the idle pulley 33 mounted to the shaft 31 for the first auxiliary 3 through the bearing 35 has the same diameter as the following pulley 32. Hence, the following pulley 32 to which the driving force is transmitted through the belt 5 for driving the first auxiliary, the shaft 31, and the idle pulley 33 wound with the belt 6 for driving the second auxiliary are allowed to be rotated at the same speeds. This arrangement can allow the driving force to be transmitted independently to the first auxiliary 3 and the second auxiliary 4, while causing little rotation of the idle pulley 33 relative to the shaft 31. Hence, abrasion of the bearing 35 is suppressed, increasing the life of the bearing 35.

The tension pulley 50 is disposed within the loop of the belt 6 for driving the second auxiliary 4 when looked from the rearward side of the engine. Hence, the auxiliary driving system, when looked from the rearward engine side, is so arranged as to be of such a compact layout that it can be accommodated within a space which is substantially large enough to accommodate the two auxiliaries so adapted as to be driven by one belt, although the driving system is composed of two systems.

It is noted herein that the tension of the belt 5 for driving the first auxiliary in accordance with extension of the belt 5 may be adjusted merely by adjusting the position of the tension pulley 50. In other words, when the tension of the belt 5 for driving the first auxiliary may be adjusted by operating an adjustment screw 51 of the tension pulley 50. On the other hand, the tension of the belt 6 for driving the second auxiliary may be adjusted by adjusting the position of the first auxiliary 3. In this case, the adjustment of the position of the first auxiliary 3 affects the magnitude of tension of the belt 5 for driving the first auxiliary, so that the tension of the belt 5 for driving the second auxiliary is to be adjusted by the tension pulley 50 simultaneously. In order to prevent wrong operation in adjusting the tension of the belt 6 for driving the second auxiliary, it is desired that, in such a state in which the belt 5 for driving the first auxiliary is wound, as shown in FIG. 3, the bolt 14 is so disposed as to allow the belt 5 to cover at least a portion of the bolt 14 on the fulcrum side of the first auxiliary 3.

In other words, this disposition can suppress the operation of the bolt 14 by tool due to the disposition of the belt 5 in such a state that the belt 5 for driving the first auxiliary is wound.

More specifically, the tension of the belt 6 for driving the second auxiliary may be adjusted in the manner as will be described hereinafter. First, the tension pulley 50 is moved in the vertical direction in the drawing and the belt 5 for driving the first auxiliary is removed. Then, the bolts 13 and 14 for the first auxiliary 3 are loosened to thereby adjust the tension of the belt 6 for driving the second auxiliary by means of the first auxiliary 3. After the adjustment of the tension for the second belt 6 has been finished, the bolts 13 and 14 are fastened to fix the first auxiliary 3. Thereafter, the belt 5 for driving the first auxiliary is wound again, followed by adjusting the tension of the first belt 5 by the tension pulley 50.

Therefore, the procedure of operation as described immediately hereinabove can be accomplished with certainty because the first belt 5 in the wound state is so disposed as to cover the fulcrum bolt 14 for the first auxiliary 3.

Figure 5:
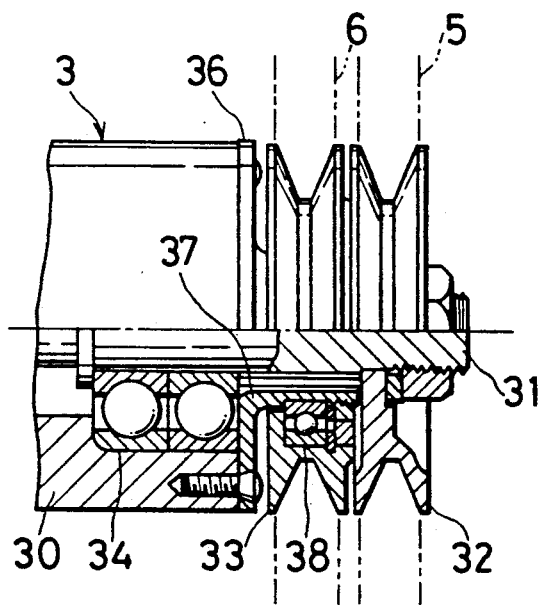
FIG. 5 is a sectional view showing an enlarged essential portion according to another embodiment of the present invention.

FIG. 5 shows another embodiment of a structure in which the idle pulley 33 is mounted to the auxiliary 3 on the light load side functioning as the first auxiliary. In this embodiment, the following pulley 32 to which the driving force is transmitted through the belt 5 for driving the first auxiliary is mounted to the shaft 31 of the first auxiliary 3. Further, as in the first embodiment as described hereinabove, the idle pulley 33 for the belt 6 for driving the second auxiliary is disposed in the position in parallel to the following pulley 32 and closer to the body 30 than the following pulley 32.

This embodiment is characterized in that the idle pulley 33 is mounted through a bearing 38 to a support sleeve 37 disposed to the body 30. Specifically, a mounting member 36 having a cylindrical support sleeve 37 is disposed at the end portion of the body 30 for the first auxiliary 3, the following pulley 32 is then mounted at a top end of the shaft 31 projecting through the inner portion of the support sleeve 37. Further, the idle pulley 33 is mounted on the periphery of the support sleeve 37 through the bearing 38.

This structure allows the pressing force applied to the idle pulley 33 from the belt 6 for driving the second auxiliary to be absorbed by the support sleeve 37, thereby allowing no force to act upon the shaft 31. Hence, the bending moment acting upon the shaft 31 can be reduced to a greater extent.

It should be understood that the present invention is interpreted to be restricted by no means to those embodiments as described hereinabove and to contain various modifications within the spirit and scope of the present invention. For instance, the auxiliaries may comprise compressors for alternator or air conditioning system, etc., on top of the vacuum pump and the oil pump for power steering as described hereinabove in the embodiments of the present invention, as long as two of various auxiliaries have different loads. Also the drive shaft for driving the auxiliary through the belt may comprise a crank shaft. It is further to be noted that this invention can likewise be applied to various engines other than the diesel engines.

What is claimed is:

1. A driving system for driving auxiliaries comprising:
    a first driving pulley and a second driving pulley disposed parallel to a driving shaft;
    a first auxiliary mounted movable to an engine body;
    a first following pulley fixed to an operating shaft of said first auxiliary;
    an idle pulley disposed rotatably and coaxially with said operating shaft thereof;
    a second auxiliary fixed to the engine body;
    a second following pulley fixed to an operating shaft of said second auxiliary;
    a tension pulley mounted movably to the engine body;
    a first belt wound around said first driving pulley, said first following pulley and said tension pulley; and
    a second belt wound around said second driving pulley, said idle pulley and said second following pulley.

2. A driving system as claimed in claim 1, wherein:
    said first auxiliary and said second auxiliary have relatively different load against the engine; and
    said first auxiliary has a smaller load and said second auxiliary has a larger load.

3. A driving system as claimed in claim 1, wherein said idle pulley is mounted to said operating shaft of said first auxiliary through a bearing.

4. A driving system as claimed in claim 1, wherein said idle pulley is mounted to a main body of said first auxiliary through a bearing.

5. A driving system as claimed in claim 1, wherein said idle pulley is disposed within or inside a locus of travel of said second belt.

6. A driving system as claimed in claim 1, wherein said first following pulley has a size in diameter identical to said idle pulley.

7. A driving system as claimed in claim 1, wherein:
    said first driving pulley is disposed at a top portion of said first driving shaft and said second driving pulley is disposed on the side of an engine body;
    said idle pulley is disposed in a position closer to the side of the engine body than said first following pulley; and
    said second belt is disposed in a position closer to the side of the engine body than said first belt.

8. A driving system as claimed in claim 7, wherein:
    said first belt covers a mounting portion for mounting said first auxiliary to the engine body.

9. A driving system as claimed in claim 8, wherein:
    said first auxiliary and said second auxiliary have relatively different load against the engine; and
    said first auxiliary has a smaller load and said second auxiliary has a larger load.

10. A driving system as claimed in claim 9, wherein said first following pulley has a size in diameter identical to said idle pulley.

11. A driving system as claimed in claim 10, wherein said idle pulley is mounted to said operating shaft of said first auxiliary through a bearing.

12. A driving system as claimed in claim 10, wherein said tension pulley is disposed inside a locus of travel of said second belt.

13. A driving system as claimed in claim 10, wherein:
    said first auxiliary is a vacuum pump; and
    said second auxiliary is an oil pump for power steering.

14. A driving system as claimed in claim 12, wherein:
    said tension pulley has an adjusting screw for transferring a shaft to which said tension pulley is mounted, in a direction in parallel to said tension pulley; and said adjusting screw is disposed in a position in which said adjusting screw does not interfere with said second belt.

15. A driving system as claimed in claim 12, wherein said driving shaft is a cam shaft.

16. A method for adjusting tension of a belt in a driving system for driving auxiliaries having:
- a first driving pulley and a second driving pulley disposed parallel to a driving shaft;
- a first auxiliary mounted movable to an engine body;
- a first following pulley fixed to an operating shaft of said first auxiliary;
- an idle pulley disposed rotatably and coaxially with said operating shaft thereof;
- a second auxiliary fixed to the engine body;
- a second following pulley fixed to an operating shaft of said second auxiliary;
- a tension pulley mounted movably to the engine body;
- a first belt wound around said first driving pulley, said first following pulley and said tension pulley; and
- a second belt wound around said second driving pulley, said idle pulley and said second following pulley;

comprising:
- step of adjusting tension of said first belt by displacing said first auxiliary; and
- step of adjusting tension of said second belt by displacing said tension pulley.

* * * * *